United States Patent
Duan (10) Patent No.: US 12,099,201 B2
(45) Date of Patent: Sep. 24, 2024

(54) DISPLAY SYSTEM, DISPLAY GLASSES AND DISPLAY SYSTEM CONTROL METHOD

(71) Applicant: GOERTEK INC., Shandong (CN)

(72) Inventor: Tao Duan, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/556,369

(22) PCT Filed: Sep. 30, 2021

(86) PCT No.: PCT/CN2021/122109
§ 371 (c)(1),
(2) Date: Oct. 20, 2023

(87) PCT Pub. No.: WO2022/222383
PCT Pub. Date: Oct. 27, 2022

(65) Prior Publication Data
US 2024/0264443 A1    Aug. 8, 2024

(30) Foreign Application Priority Data

Apr. 22, 2021 (CN) .......................... 202110438933.9

(51) Int. Cl.
*G02B 27/01* (2006.01)
(52) U.S. Cl.
CPC .. *G02B 27/0172* (2013.01); *G02B 2027/0178* (2013.01)
(58) Field of Classification Search
CPC .................. G02B 27/0172; G02B 2027/0178
See application file for complete search history.

(56) References Cited

U.S. PATENT DOCUMENTS

| | | | |
|---|---|---|---|
| 9,519,092 B1 * | 12/2016 | Miao | G02B 27/0172 |
| 2010/0232016 A1 | 9/2010 | Landa et al. | |
| 2015/0187141 A1 | 7/2015 | Bromer | |
| 2015/0219933 A1 | 8/2015 | Lee et al. | |

(Continued)

FOREIGN PATENT DOCUMENTS

| | | |
|---|---|---|
| CN | 1431533 A | 7/2003 |
| CN | 109856796 A | 6/2019 |

(Continued)

OTHER PUBLICATIONS

International Search Report from International Application No. PCT/CN2021/122109 mailed Jan. 12, 2022.

*Primary Examiner* — Collin X Beatty
(74) *Attorney, Agent, or Firm* — Shih IP Law Group, PLLC (57) ABSTRACT

The disclosure discloses a display system, display glasses and a display system control method. The display system includes an eyeglass, a first optical engine, a light guide, and a light receiver. The eyeglass includes a first display area and a non-display area. Imaging light emitted from the first optical engine is received by the first display area. The light guide is disposed on a periphery of the eyeglass or at least a part of the light guide is disposed in the non-display area, and the light guide is provided with an optical communication channel for light transmitting. The first optical engine is disposed at one end of the optical communication channel, and the light receiver is disposed at another end of the optical communication channel. The technical solution of the disclosure can avoid increasing the size of the glasses.

13 Claims, 3 Drawing Sheets

(56) References Cited

U.S. PATENT DOCUMENTS

| | | |
|---|---|---|
| 2016/0335800 A1 | 11/2016 | DeStories et al. |
| 2018/0007312 A1 | 1/2018 | Ogino |
| 2018/0329212 A1 | 11/2018 | Aiki |
| 2019/0361256 A1 | 11/2019 | Miller |
| 2020/0227085 A1 | 7/2020 | Potnis et al. |
| 2021/0103146 A1 | 4/2021 | Travers et al. |

FOREIGN PATENT DOCUMENTS

| | | |
|---|---|---|
| CN | 110196494 A | 9/2019 |
| CN | 111474717 A | 7/2020 |
| CN | 211857058 U | 11/2020 |
| CN | 211857059 U | 11/2020 |
| CN | 113176669 A | 7/2021 |
| WO | 2014074858 A1 | 5/2014 |
| WO | 2020048536 A1 | 3/2020 |
| WO | 2020139754 A1 | 7/2020 |
| WO | 2021175587 A1 | 9/2021 |

\* cited by examiner

DISPLAY SYSTEM, DISPLAY GLASSES AND DISPLAY SYSTEM CONTROL METHOD

The present application claims the priority of Chinese patent application No. 202110438933.9, entitled "DISPLAY SYSTEM, DISPLAY GLASSES AND DISPLAY SYSTEM CONTROL METHOD", and filed to China National Intellectual Property Administration (CNIPA) on Apr. 22, 2021, the entire disclosure of which are incorporated herein by reference.

TECHNICAL FIELD

The disclosure relates to the technical field of optical display, and particularly, to a display system, display glasses and a display system control method.

DESCRIPTION OF RELATED ART

A display image may be added to a picture of the real world by using augmented reality (AR) display technology, to provide an augmented reality experience to users. Signals are usually required to be transmitted between two temples or between a front frame and the temples for AR glasses. In prior art, a flexible circuit board is generally used to transmit signal through a circuit thereon. However, the size of the glasses might be increased due to the flexible circuit board, which limits the miniaturization of the AR glasses.

SUMMARY

Based on the above, in response to the problem that the size of the glasses is increased due to the flexible circuit board and the limitations on the miniaturization of the AR glasses, it is necessary to provide a display system, display glasses, and a display system control method to avoid increasing the size of the glasses and to realize the miniaturization of the glasses.

To achieve the above purposes, the present disclosure provides a display system includes: an eyeglass comprising a first display area and a non-display area; a first optical engine, wherein the first display area receives imaging light emitted from the first optical engine; a light guide, wherein the light guide is disposed on a periphery of the eyeglass or at least a part of the light guide is disposed in the non-display area, and the light guide is provided with an optical communication channel for light transmitting; and a light receiver, wherein the first optical engine is disposed at one end of the optical communication channel, and the light receiver is disposed at another end of the optical communication channel.

Optionally, the light receiver includes a second optical engine, the eyeglass includes a first eyeglass and a second eyeglass, the first eyeglass is provided with the first display area, the second eyeglass is provided with a second display area, and the second display area receives imaging light emitted from the second optical engine.

Optionally, the first eyeglass and the second eyeglass are integrally formed, and the light guide is disposed in the eyeglass.

Optionally, the first eyeglass and the second eyeglass are separately formed, the optical guide includes a first waveguide section, a second waveguide section and an optical fiber section, the first waveguide section is disposed in the first eyeglass, the second waveguide section is disposed in the second eyeglass, the optical fiber section is disposed between the first eyeglass and the second eyeglass, and the first waveguide section, the optical fiber section and the second waveguide section are sequentially connected to form the optical communication channel.

Optionally, the display system includes one signal processing component, the signal processing component is used to receive display information from outside and convert the display information into corresponding electrical signals, the signal processing component is disposed close to the first optical engine or the second optical engine, and the signal processing component is electrically connected to the first optical engine or the second optical engine which is close to the signal processing component, or the display system includes two signal processing components, the signal processing components are used to receive display information from outside and convert the display information into corresponding electrical signals, one signal processing component is disposed close to the first optical engine, another signal processing component is disposed close to the second optical engine, and the first optical engine and the second optical engine are electrically connected to the signal processing component to which it is close, respectively.

Optionally, the display system includes a frame, the frame includes a front frame and temples, the temples are disposed on opposite sides of the front frame, the eyeglass is disposed in the front frame, and the first optical engine is disposed in the temple or the front frame.

Optionally, the eyeglass further includes a first display coupling input area disposed in the non-display area, and wherein the eyeglass is provided with a first waveguide channel for light transmission, and the first waveguide channel is disposed between the first display coupling input area and the first display area, and light incident into the first display coupling input area is transmitted to the first display area through the first waveguide channel.

Optionally, the eyeglass further includes a first communication coupling input area disposed in the non-display area, and light emitted to the first communication coupling input area is transmitted into the light receiver through the optical communication channel.

Optionally, the first optical engine includes a lens, a light emitting surface of the lens faces the eyeglass, the light emitting surface of the lens includes a central area and an edge area, the central area is located at the center portion of the light lens surface, and the edge area is located around the central area, and wherein the central area transmits light for imaging display, the edge area transmits light for optical communication, the first display coupling input area is corresponding to the central area, and the first communication coupling input area is corresponding to the edge area.

Optionally, the eyeglass further includes a second display coupling input area disposed in the non-display area, the eyeglass includes a second waveguide channel disposed between the second display coupling input area and the second display area, and light incident into the second display coupling input area is transmitted to the second display area through the second waveguide channel.

Optionally, the eyeglass further includes a second communication coupling input area disposed in the non-display area, and light incident into the second communication coupling input area is transmitted to the first optical engine through the optical communication channel.

In addition, to achieve the above purpose, the disclosure further provides display glasses comprising: a power supply; and the display system as above, wherein the power supply is connected to the first optical engine.

In addition, in order to achieve the above purpose, the disclosure further provides a display system control method applied to the display system as above, and the display system control method including: receiving an imaging electrical signal by the first optical engine, and generating, by the first optical engine, communication light and first light for projecting display according to the imaging electrical signal, where the communication light includes information for imaging display; projecting the first light to the first display area by the first optical engine, and transmitting, by the first optical engine, the communication light to the light receiver through the optical communication channel of the optical guide; and receiving the communication light by the light receiver.

Optionally, the light receiver includes a second optical engine, the eyeglass of the display system includes a first eyeglass and a second eyeglass, the first eyeglass is provided with the first display area, the second eyeglass is provided with a second display area, and the display system control method further includes: generating a second light for projecting display according to the communication light by the second optical engine; projecting the second light to the second display area by the second optical engine.

In the technical solution proposed in the disclosure, the first optical engine is used for signal conversion between electricity and light. The first optical engine converts electrical signals into corresponding optical signals. Light is emitted from the first optical engine. The light includes imaging light for imaging display and communication light for transmitting communication. The communication light is transmitted in the optical communication channel, such that the communication of the optical signals is formed between the first optical engine and the light receiver. In the disclosure, the optical guide is provided with the optical communication channel for light transmitting, and the optical communication channel is used to transmit light. The Eyeglass is also used to transmit light. The light guide is disposed on the periphery of the eyeglass or at least a part of the light guide is disposed in the eyeglass, which can make full use of the space of the eyeglass, to avoid increasing the size of the glasses and realize the miniaturization of the glasses.

BRIEF DESCRIPTION OF DRAWINGS

In order to illustrate the technical solutions in the embodiments of the disclosure or the prior art more clearly, the drawings required to be used in the content of the embodiments or the prior art will be introduced briefly as following. It should be understood that, the drawings in the following description are merely several embodiments of the disclosure, and for those of ordinary skill in the art, other drawings can also be obtained from the structure illustrated in these drawings without any creative effort.

INTRODUCTION OF REFERENCE SIGNS

| Reference signs | components | Reference signs | components |
|---|---|---|---|
| 100 | eyeglass | 123 | second communication coupling input area |
| 110 | first eyeglass | 124 | second waveguide channel |
| 111 | first display area | 210 | first optical engine |
| 112 | first display coupling input area | 220 | second optical engine |
| 113 | first communication coupling input area | 300 | light guide |
| 114 | first waveguide channel | 310 | first waveguide section |
| 101 | non-display area | 320 | second waveguide section |
| 120 | second eyeglass | 330 | optical fiber section |
| 121 | second display area | 400 | signal processing component |
| 122 | second display coupling input area | | |

DETAILED DESCRIPTIONS

The technical solution in the embodiments of the disclosure will be described as following in combination with the drawings in the embodiments of the disclosure. Obviously, the described embodiments are only a part of the embodiments of the disclosure, but not all of the embodiments. Based on the embodiments of the disclosure, all other embodiments obtained by those ordinary skilled in the art without creative labor fall within the protection scope of the disclosure.

It should be noted that all directional indications (such as up, down, left, right, front, back, etc.) in embodiments of the disclosure are only used to explain the relative position relationship and motion condition between the components in a specific gesture (as shown in the drawing). If the specific gesture changes, the directional indication will be change accordingly.

In addition, the descriptions related to "first", "second", etc. in the disclosure are only used for purpose of illustration, and cannot be understood as indicating or implying their relative importance or implying the number of indicated technical features. Therefore, the feature defined by "first" and "second" may explicitly or implicitly includes at least one of the features. In the description of the disclosure, "a plurality" means at least two, for example, two, three, etc., unless expressly specified otherwise.

In the disclosure, unless specific provision and definition otherwise, the terms "connect", "fix", etc. shall be understood in a broad sense, for example, "fix" may be a fixed connection, a detachable connection, or as a whole; it can be mechanical connection, or it can be electrical connection; it can be directly connected, or it can be indirectly connected by an intermediate medium, and it can be a connection inside two components or an interaction between two components, unless expressly specified otherwise. For those ordinary skilled in the art, the specific meaning of the above terms in the disclosure may be understood according to specific circumstances.

In addition, the technical solutions of respective embodiments can be combined with each other, but must be based on that those ordinary skilled in the art can achieve the solutions. When the combination of technical solutions is contradictory or cannot be realized, it shall be considered that such combination of technical solutions does not exist and is not within the scope of protection required by the disclosure.

In related technology, augmented reality display technology is also known as AR display technology. In order to realize communication function, the signal is normally required to be transmitted from one temple to another temple of the glasses or from one side to another side of the front frame. A flexible circuit board is generally used in the prior art, and the installation of the circuit board requires an installation space, the size of the glasses might be increased, which is not beneficial to the miniaturization of the AR glasses.

Figure 1:
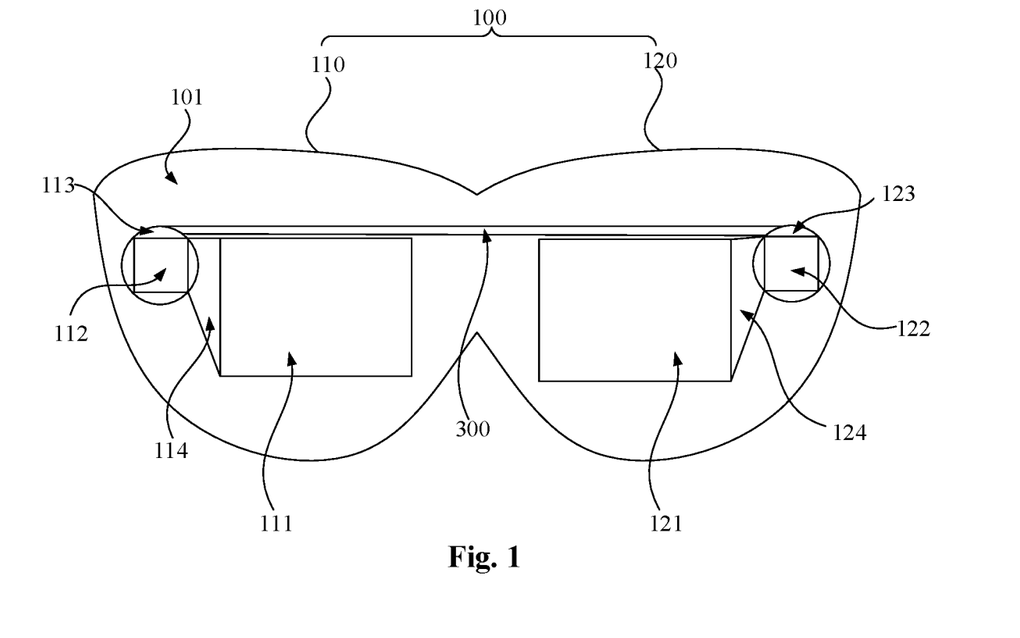
FIG. 1 is a structural diagram of the display system of one embodiment of the disclosure.

In order to solve the above problem, as shown in FIG. 1, the disclosure provides a display system, which may be applied in an AR display apparatus or a virtual reality (VR) display apparatus. The display system includes: eyeglass 100, a first optical engine 210, a light guide 300 and a light receiver (not shown). The eyeglass 100 may be construed as a light waveguide sheet, or as an optical glass with a total reflection channel. The light emitted from the first optical engine 210 is incident on the eyeglass 100, and finally emits out from the eyeglass 100 to the user's eyes, to achieve the user's augmented reality or virtual reality experience.

The technical solution provided by the embodiment of the disclosure may be implemented as a single optical engine and two optical engines.

In the case of a single optical engine, the display system includes an eyeglass 100, a first optical engine 210, a light guide 300 and a light receiver (not shown).

The first optical engine 210 is disposed on a side of the eyeglass 100 to avoid interfering the user's viewing angle. The light guide 300 is disposed on the eyeglass 100, for example, in the eyeglass 100, or in a part of the eyeglass 100. The light receiver is used to receive an optical signal, such as some control signals or control instructions. After receiving the corresponding optical signal, the light receiver processes the optical signal, to realize the signal transmission between the left side and the right side of the eyeglass 100 (or to realize the signal transmission between the left temple and the right temple connected to both ends of the eyeglass 100).

The eyeglass 100 includes a first display area 111 and a non-display area 101. A surface of the eyeglass 100 is provided with a light coupling input area and a light coupling output area. The light enters from the light coupling input area and is transmitted in the eyeglass 100 by total reflection, and then emitted from the light coupling output in area. It can be understood that the first display area 111 is the light coupling output area. For example, a coupling output grating is provided in the first display area 111, the light is ensured to be coupling output through the coupling output grating. Alternatively, a spectroscopic film is disposed at a position corresponding to the first display area 111. The light transmitted in the eyeglass 100 is split and emitted from the spectroscopic film. It should be noted that the user has a left eye and a right eye, in order to ensure that the user can obtain a three-dimensional experience, the coverage area of the first display area 111 have to be large enough to enclose the whole field of view of the user's eyes.

The first optical engine 210 is disposed close to the first display area 111, the first display area 111 receives imaging light emitted from the first optical engine 210, the first optical engine 210 is provided with a photoelectric conversion device therein, which is capable of converting an electrical signal into an optical signal, and converting an optical signal into an electrical signal. The first optical engine 210 receives the electrical signal, and an optical signal is formed by electro-optical conversion. The optical signal includes imaging light for imaging display and communication light for transmitting communication. The first optical engine 210 introduces the two lights into corresponding transmission path, respectively.

The optical guide 300 is disposed on the eyeglass 100. In particular, the optical guide 300 is disposed on a periphery of the eyeglass 100 or at least part of the optical guide 300 is disposed in the non-display area 101, so as to avoid interfering viewing the image through the first display area 111 by the user. The optical guide 300 forms an optical communication channel for light transmitting, and the optical communication channel extends from the first optical engine 210 to the light receiver to allow the optical communication between the first optical engine 210 and the light receiver. The communication light used to transmit communication travels through the optical communication channel. Among them, the light guide 300 may be an independent light conduction device, or may be integrally formed with the eyeglass 100. For example, when the optical guide 300 is an independent light conductive device, a groove is formed in the eyeglass 100, and the optical guide 300 is provided in the groove. The groove extends from the first optical engine 210 to the light receiver. Alternately, when the optical guide 300 integrally formed with the eyeglass 100, the optical communication channel is processed in the eyeglass 100 by etching, and the communication light travels in the optical communication channel formed in the eyeglass 100.

In the technical solution proposed in this embodiment, the first optical engine 210 is used to convert the signal between electricity and light. The first optical engine 210 converts the electrical signals into the corresponding optical signals. Light emits from the first optical engine 210. The light includes imaging light for imaging display and communication light for transmitting communication. The communication light is transmitted in the optical communication channel, such that the communication of the optical signal is formed between the first optical engine 210 and the light receiver. In this solution, the optical guide is provided with an optical communication channel for light transmitting, and the optical communication channel is used to transmit light. The eyeglass is also used to transmit light. The light guide is disposed in the eyeglass, to make full use of the space of the eyeglass. Thus, it can be known that the optical guide for transmitting the communication light in this embodiment may utilize the space of the eyeglass to limit the way of providing wires outside of the eyeglass. Thus, the space for installing the wires can be reduced which is not beneficial to the miniaturization of the AR glasses.

At the same time, the first optical engine performs two functions. The optical engine emits the communication light with control information, and emits the imaging light with display image information, to achieve augmented reality function without adding additional devices.

In addition, transmitting signals by wires is easy to cause signals to interfere with each other, resulting in reduced transmission efficiency, signal strength attenuation, or the transmission of data not accurate enough. However, using the way of light conduction, the interference of the light may be avoided, to ensure the transmission efficiency and the signal strength, and to ensure the accuracy of data.

It should be noted that in the above embodiments, there are three cases for the position of the light guide. The first case is that the light guide is provided in the eyeglass. In order to make full use of the internal structure of the eyeglass, the light guide is embedded in the eyeglass.

The second case is that the light guide is provided on the periphery of the eyeglass. For example, the light guide is attached to the eyeglass, and the light guide can be processed according to the structure and the shape of the eyeglass, and the space can be reduced.

The third case is that one part of the light guide is disposed in the eyeglass and another part is disposed on the periphery of the eyeglass. For example, the one part of the light guide is embedded in the eyeglass, and the other part is disposed at the outside the eyeglass. This way is more flexible, and the position of the light guide may be provided flexibly according to the structure of the eyeglass.

In the case of two optical engines, the display system may include an eyeglass 100, a first optical engine 210, a light guide 300, and a light receiver (not shown in the drawing). Among them, the light receiver includes a second optical engine 220, the eyeglass includes a first eyeglass and a second eyeglass, the first eyeglass is provided with a first display area, the second eyeglass is provided with a second display area, and the second display area receives the imaging light emitted from the second optical engine 220. The first display area 111 and the second display area 121 are located on the same surface of the eyeglass 100. Since the user has a left eye and a right eye, in order to ensure that the user can obtain a three-dimensional experience, the first display area 111 and the second display area 121 are provided separated with each other. For example, the first display area 111 corresponds to the user's left eye, and the second display area 121 corresponds to the user's right eye. The second optical engine 220 is further provided with a photoelectric conversion device therein, for signal conversion between electricity and light. The photoelectric conversion device is capable of converting an electrical signal into an optical signal, and converting an optical signal into an electrical signal.

At this time, the communication signal transmitted by the optical guide may include a display screen synchronization signal of the first optical engine and the second optical engine, and by using the above technical solution, the display screen synchronization signal may also be transmitted from one side of the eyeglass to another side of the eyeglass, to realize the synchronous projection of the display screen for the first optical engine and the second optical engine.

In the above embodiment, the eyeglass 100 may be disposed in at least two manners, i.e., the eyeglass 100 being provided integrally or provided separately. Referring to FIG. 1 again, the eyeglass 100 includes a first eyeglass 110 and a second eyeglass 120, the first display area 111 is provided at the first eyeglass 110, and the second display area 121 is provided at the second eyeglass 120. The first eyeglass 110 and the second eyeglass 120 are integrally formed with each other, and the light guide 300 is disposed in the eyeglass 100. As the first eyeglass 110 and the second eyeglass 120 are integrally formed with each other, assembly is facilitated. The installation of the eyeglass 100 may be completed through one-time installation, which improves the installation efficiency.

Figure 2:
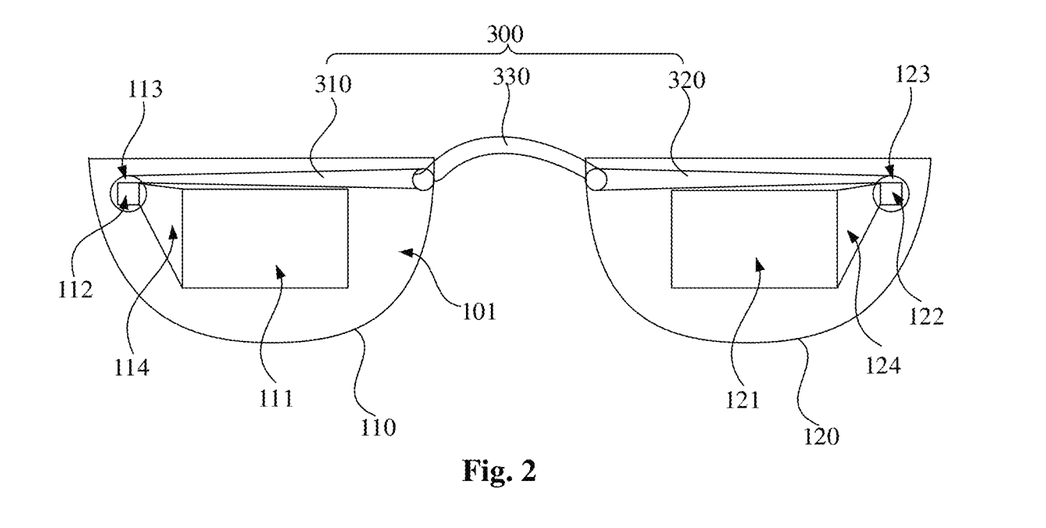
FIG. 2 is a structural diagram of the display system of another embodiment of the system of the disclosure.

In another embodiment, referring to FIG. 2, the first eyeglass 110 and the second eyeglass 120 are separately disposed, the optical guide 300 includes a first waveguide section 310, a second waveguide section 320 and an optical fiber section 330, the first waveguide section 310 is disposed in the first eyeglass 110, the second waveguide section 320 is disposed in the second eyeglass 120, the optical fiber section 330 is disposed between the first eyeglass 110 and the second eyeglass 120, and the first waveguide section 310, the optical fiber section 330 and the second waveguide section 320 are sequentially connected to form an optical communication channel. The light is totally reflected in the first waveguide section 310, the second waveguide section 320 and the optical fiber section 330 to ensure the smooth transmission of light. The separately disposed of the eyeglass is more suitable for the user's wearing habits. For example, the display system includes a frame, the frame includes a front frame and a temple. Among them, the front frame includes the left front frame and the right front frame, the first eyeglass 110 is disposed in the left front frame, and the second eyeglass 120 is disposed in the right front frame. A nose bridge is connected between the left front frame and the right front frame, and the light may be extended along the shape of the nose bridge. In this way, the user's wearing is not affected, and the optical fiber section 330 is protected by the nose bridge, to avoid the fracture of the optical fiber section 330.

Figure 3:
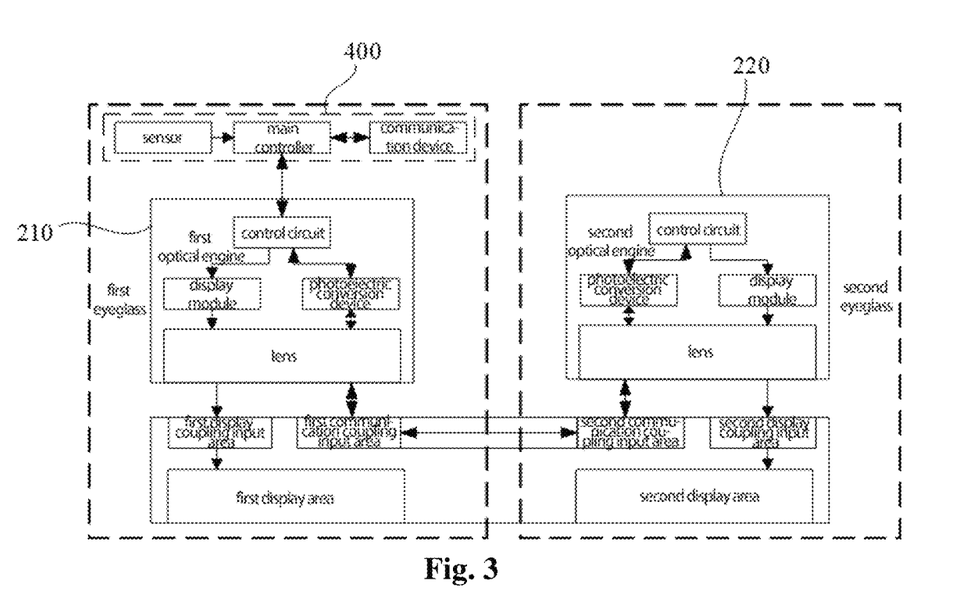
FIG. 3 is a structural diagram of the principle of the display system in FIG. 1.

In one embodiment, as shown in FIG. 3, the display system includes a signal processing component 400, which is used to receive display information from outside and convert the display information into corresponding electrical signals. The signal processing component 400 is close to the first optical engine 210 or the second optical engine 220. The signal processing module 400 is electrically connected to the first optical engine 210 or the second optical engine 220 close to the signal processing module 400. Among them, the signal processing component 400 includes a main controller, a sensor and a communication device, the main controller is electrically connected to the sensor and the communication device, the sensor is used to detect changes in the surrounding environment, and the communication device is used to receive the communication signal transmitted from outside, where the communication signal includes a screen signal required to be displayed. After receiving the communication signal, the communication device transmits the communication signal to the main controller. The main controller also receives environmental signals detected by the sensor. The main controller generates an electrical signal for controlling the operation of the optical engine according to the environmental signal and the communication signal, and transmits the electrical signal to the first optical engine 210, so that the first optical engine 210 may perform electro-optical conversation. Generally, there is provided one signal processing component 400, which can be disposed close to the first optical engine 210 or close to the second optical engine 220. For example, the signal processing component 400 is disposed close to the first optical unit 210, and the signal processing component 400 transmits the electrical signal to the first optical unit 210. A photoelectric conversion device and a control circuit are provided in the first optical engine 210. After receiving the electrical signal, the first optical engine 210 transmits the electrical signal to the photoelectric conversion device by the control circuit, and the photoelectric conversion device forms communication light by the electro-optical conversion. The first optical engine 210 is further provided with a display module therein, the control circuit transmits the electrical signal to the display module, and the display module forms the imaging light for imaging display. Thus, in this embodiment, the first optical engine 210 may generate two kinds of light for different purposes. Of course, in order to avoid the interference between the imaging light and the communication light, the wavelength of the imaging light is in a visible light range, and the wavelength of the communication light is in an invisible light range. For example, the communication light may be infrared light or ultraviolet light. After first optical engine 210 generates the communication light, the communication light enters into the optical communication channel for transmitting. The second optical engine 220 receives the communication light, and a control circuit, a photoelectric conversion device and a display module are further provided in the second optical engine 220. After receiving the communication light, the photoelectric conversion device of the second optical engine 220 converts the communication light into an electrical signal and transmits the electrical signal to the control circuit of the second optical engine 220, and the control circuit transmits the electrical signal to the display module of the second optical engine 220. The display module of the second optical engine 220 converts the electrical signal to the imaging light for imaging display. Thus, in this embodiment, the communication light is transmitted from the first optical engine 210 to the second optical engine 220. Similarly, the signal processing component 400 may be provided close to the second optical engine 220, and the communication light may be transmitted from the second optical engine 220 to the first optical engine 210.

In another embodiment, the display system includes two signal processing components 400, which are used to receive display information from outside and convert the display information into corresponding electrical signals, one signal processing component 400 is disposed close to the first optical engine 210, and another signal processing component 400 is disposed close to the second optical engine 220. The first optical engine 210 and the second optical engine 220 are electrically connected to the adjacent signal processing module 400, respectively. That is, the first optical engine 210 and the second optical engine 220 may transmit communication light to each other by disposing the signal processing components 400 in left and right directions respectively, the accurate identification of the environmental conditions can be ensured, and the first optical engine 210 and the second optical engine 220 are coordinate with each other to process the signals transmitted by each other, to ensure that the display of the image effect is better and real. In addition, it should be noted out that two optical communication channels may be provided to avoid interference between the communication lights transmitted by the first optical engine 210 and the second optical engine 220. Of course, wavelengths of the communication lights emitted from the first optical engine 210 and the second optical engine 220 may be disposed to be different, to avoid the interference therebetween.

In an embodiment, the display system includes a frame, the frame includes a front frame and two temples disposed on opposite sides of the front frame, the eyeglass 100 is disposed in the front frame, and the first optical engine 210 is disposed in the temple. The first optical engine 210 is disposed in the position of the temples, which can make full use of the space of the temples. Alternatively, the first optical engine 210 may be disposed in the position of the front frame, which can make full use of the space of the front frame. In the case that the second optical engine 220 is provided, the second optical engine 220 may be also disposed in the position of the temple or the position of the front frame.

In an embodiment, the eyeglass 100 further includes a first display coupling input area 112, which is disposed in a non-display area 101. The non-display area 101 is an area outside of the first display area 111 and the second display area 121. The first display coupling input area 112 is disposed in the non-display area 101, to avoid interfering the position of the first display area 111, and further avoid interfering the user's visual experience.

The eyeglass 100 forms a first waveguide channel 114 for light transmission, and the imaging light is transmitted in the first waveguide channel 114 by total reflection of light. The first waveguide channel 114 is disposed between the first display coupling input area 112 and the first display area 111, and the first waveguide channel 114 is connected to the first display coupling input area 112 and the first display area 111. The light incident into the first display coupling input area 112 is transmitted to the first display area 111 through the first waveguide channel 114. The imaging light is imaged at the position of the human's eyes after passing through the first display area 111.

Further, the eyeglass 100 further includes a first communication coupling input area 113 disposed in the non-display area 101. Similarly, the first communication coupling input area 113 is disposed in the non-display area 101, to avoid interfering the user's visual experience. The first communication coupling input area 113 is connected to the optical guide 300. Thus, the light incident into the first communication coupling input area 113 transmits to the light receiver through the optical communication channel.

In the above embodiment, in order to reduce the mutual interference between the imaging light and the communication light, the first optical engine 210 includes a lens, a light emitting surface of the lens faces the eyeglass 100, the light emitting surface of the eyeglass includes a central area and an edge area, the central area is located at a center portion of the light emitting surface, and the edge area is located at the periphery portion of the light emitting surface around the central area. The central area transmits light for imaging display, i.e., the imaging light. The edge area transmits light for optical communication, i.e., the communication light. The first display coupling input area 112 is disposed corresponding to the central area, and the first communication coupling input area 113 is disposed corresponding to the edge area. That is, the imaging light and the communication light correspond to different positions of the eyeglass, and the imaging light and the communication light are transmitted separately, to reduce the mutual interference therebetween. For example, the light emitting surface of the eyeglass has a circle shape, the center area may have a square shape in the circle shape, and the edge area corresponds to a position between the circle shape and the square shape. Of course, the central area may also be an area having a circle shape or other shapes.

In the above embodiment, the eyeglass 100 further includes a second display coupling input area 122. In order to reduce the block of the user's viewing angle by the second display coupling input area 122, the second display coupling input area 122 is disposed in the non-display area 101. The eyeglass 100 includes a second waveguide channel 124, which is disposed between the second display coupling input area 122 and the second display area 121, the second waveguide channel 124 is connected to a second display coupling input area 122 and the second display area 121. The light incident into the second display coupling region 122 transmits to the second display region 121 through the second waveguide channel 124. The imaging light is imaged at the position of the human's eyes after passing through the second display area 121.

Further, the eyeglass 100 further includes a second communication coupling input area 123 disposed in the non-display area 101. Similarly, the second communication coupling input area 123 is disposed in the non-display area 101, to avoid interfering the user's visual experience. The second communication coupling input area 123 is connected to the optical guide 300. Thus, the light incident into the second communication coupling input area 123 transmits to the first optical engine 210 through the optical communication channel.

Herein, it should to be noted that the first communication coupling input area 113 and the second communication coupling input area 123 can not only coupling input the emitted light, but also can be used as the coupling output area. For example, the communication light is transmitted from the second optical engine 220 to the first optical engine 210, and the communication light is emitted from the second communication coupling input area 123, and coupling output by the first communication coupling input area 113. Alternatively, the communication light is transmitted from the first optical engine 210 to the second optical engine 220, and the communication light is emitted from the first communication coupling input area 113 and is coupling output by the second communication coupling input area 123.

The present disclosure further provides display glasses comprising a power supply and a display system as above, in which the power supply is connected to the first optical engine. The power supply is used to provide power to the first optical engine, to ensure the projecting display function of the display system.

Among them, the specific embodiments of display glasses may refer to the embodiments of the display system, which will not be described here.

Figure 4:
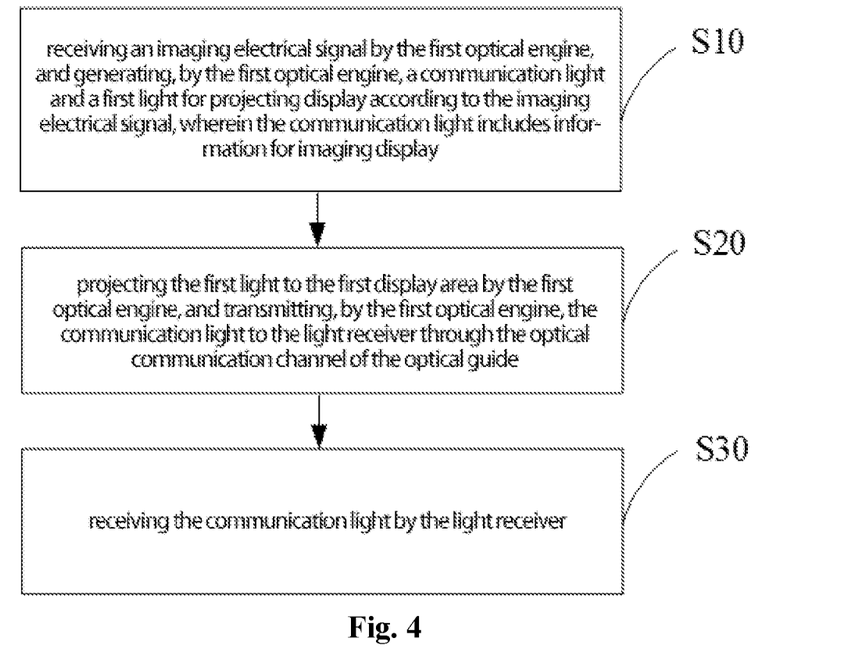
FIG. 4 is a flow diagram of the steps of the display system control method of one embodiment in FIG. 1.

As shown in FIG. 4, the disclosure further provides a signal transmission method, which is applied to the display system as described above. The signal transmission method includes the following steps.

Step S10, receiving an imaging electrical signal by the first optical engine, and generating, by the first optical engine, communication light and first light for projecting display according to the imaging electrical signal. Here, the communication light includes information for imaging display. The first optical engine is provided with a photoelectric conversion device and a control circuit. After receiving the electrical signal, the first optical engine transmits the electrical signal to the photoelectric conversion device by the control circuit, and the photoelectric conversion device forms the communication light by the electro-optical conversion.

Step S20, projecting the first light to the first display area by the first optical engine, and transmitting, by the first optical engine, the communication light to the light receiver through the optical communication channel of the optical guide. The first optical engine is further provided with a display module, the control circuit transmits the electrical signal to the display module, the display module forms the first light for imaging display, the first optical engine transmits the first light to the first display area by the eyeglass, the first light passes through the first display area, to project image to the position of the human eyes.

Step S30, receiving the communication light by the light receiver, and the light receiver generates a projecting display control command etc. according to the communication light. The light receiver is further provided with a control circuit and a photoelectric conversion device. After receiving the communication light, the photoelectric conversion device of the light receiver converts the communication light into an imaging electrical signal, and transmits the imaging electrical signal to the control circuit of the light receiver.

Figure 5:
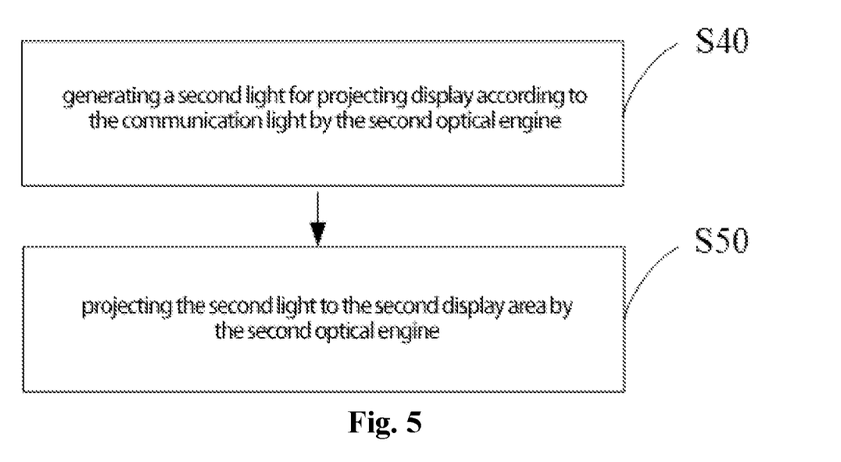
FIG. 5 is a flow diagram of the steps of the display system control method of another embodiment in FIG. 1.

Further, as shown in FIG. 5, the light receiver includes a second optical engine, the eyeglass of the display system further includes a first eyeglass and a second eyeglass, the first eyeglass is provided with the first display area, the second eyeglass is provided with a second display area, and the control method further includes:

Step S40, generating a second light for projecting display according to the communication light by the second optical engine. The second optical engine is further provided with a display module, the control circuit of the second optical engine transmits the imaging electrical signal to the display module of the second optical engine. The display module of the second optical engine converts the second light for imaging display according to the electrical signal, and the first light and the second light display the same content.

Step S50, projecting the second light to the second display area by the second optical engine. The second optical engine transmits the second light to the second display area by the eyeglass, and the second light passes through the second display area to project the image to the position of the human eyes, so as to ensure that synchronization of the display pictures of the first display area and the second display area.

The above embodiments are only preferred embodiments of the disclosure, and are not intended to limit the patent scope of the disclosure. Under the inventive concept of the disclosure, equivalent structural transformations made using the description and drawings of the disclosure or direct/indirect applications in other related technical fields, are included in the scope of patent protection of the disclosure.

What is claimed is:

1. A display system comprising:
an eyeglass comprising a first display area and a non-display area;
a first optical engine, wherein the first display area receives imaging light emitted from the first optical engine;
a light guide disposed on a periphery of the eyeglass or at least a part of the light guide is disposed in the non-display area, and the light guide is provided with an optical communication channel for light transmitting; and
a light receiver,
wherein the first optical engine is disposed at one end of the optical communication channel, and the light receiver is disposed at another end of the optical communication channel,
wherein the first optical engine receive an imaging electrical signal and generates communication light and first light for projecting display according to the imaging electrical signal, and the communication light includes information for imaging display.

2. The display system according to claim 1, wherein the light receiver comprises a second optical engine, the eyeglass comprises a first eyeglass and a second eyeglass, the first eyeglass is provided with the first display area, the second eyeglass is provided with a second display area, and the second display area receives imaging light emitted from the second optical engine.

3. The display system according to claim 2, wherein the first eyeglass and the second eyeglass are integrally formed, and the light guide is disposed in the eyeglass, or
wherein the first eyeglass and the second eyeglass are separately formed, the optical guide comprises a first waveguide section, a second waveguide section and an optical fiber section, the first waveguide section is disposed in the first eyeglass, the second waveguide section is disposed in the second eyeglass, the optical fiber section is disposed between the first eyeglass and the second eyeglass, and the first waveguide section, the optical fiber section and the second waveguide section are sequentially connected to form the optical communication channel.

4. The display system according to claim 2, wherein the display system comprises one signal processing component, the signal processing component is used to receive display information from outside and convert the display information into corresponding electrical signals, the signal processing component is disposed close to the first optical engine or the second optical engine, and the signal processing component is electrically connected to the first optical engine or the second optical engine which is close to the signal processing component, or wherein the display system comprises two signal processing components, the signal processing components are used to receive display information from outside and convert the display information into corresponding electrical signals, one signal processing component is disposed close to the first optical engine, another signal processing component is disposed close to the second optical engine, and the first optical engine and the second optical engine are electrically connected to the signal processing component to which it is close, respectively.

5. The display system according to claim 1, wherein the display system comprises a frame, the frame comprises a front frame and temples, the temples are disposed on opposite sides of the front frame, the eyeglass is disposed in the front frame, and the first optical engine is disposed in the temple or the front frame.

6. The display system according to claim 1, wherein the eyeglass further comprises a first display coupling input area disposed in the non-display area, and wherein the eyeglass is provided with a first waveguide channel for light transmission, and the first waveguide channel is disposed between the first display coupling input area and the first display area, and light incident into the first display coupling input area is transmitted to the first display area through the first waveguide channel.

7. The display system according to claim 6, wherein the eyeglass further comprises a first communication coupling input area disposed in the non-display area, and light incident into the first communication coupling input area is transmitted to the light receiver through the optical communication channel.

8. The display system according to claim 7, wherein the first optical engine comprises a lens, a light emitting surface of the lens faces the eyeglass, the light emitting surface of the lens comprises a central area and an edge area, the central area is located at a center portion of the light emitting surface, and the edge area is disposed around the central area, and wherein the central area transmits light for imaging display, the edge area transmits light for optical communication, the first display coupling input area is corresponding to the central area, and the first communication coupling input area is corresponding to the edge area.

9. The display system according to claim 6, wherein the eyeglass further comprises a second display coupling input area disposed in the non-display area, wherein the eyeglass comprises a second waveguide channel disposed between the second display coupling input area and the second display area, and light incident into the second display coupling input area is transmitted to the second display area through the second waveguide channel.

10. The display system according to claim 9, wherein the eyeglass further comprises a second communication coupling input area disposed in the non-display area, and light incident into the second communication coupling input area is transmitted to the first optical engine through the optical communication channel.

11. A display glasses comprising: a power supply; and
the display system according to claim 1,
wherein the power supply is connected to the first optical engine.

12. A display system control method applied to the display system according to claim 1, and the display system control method comprising:

receiving an imaging electrical signal by the first optical engine, and generating, by the first optical engine, a communication light and a first light for projecting display according to the imaging electrical signal, wherein the communication light includes information for imaging display;

projecting the first light to the first display area by the first optical engine, and transmitting, by the first optical engine, the communication light to the light receiver through the optical communication channel of the optical guide; and receiving the communication light by the light receiver.

13. The display system control method according to claim 12, wherein the light receiver comprises a second optical engine, the eyeglass of the display system comprises a first eyeglass and a second eyeglass, the first eyeglass is provided with the first display area, the second eyeglass is provided with a second display area, and the display system control method further comprises:

generating a second light for projecting display according to the communication light by the second optical engine;

projecting the second light to the second display area by the second optical engine.

* * * * *